United States Patent [19]

Ohta

[11] Patent Number: 4,987,490

[45] Date of Patent: Jan. 22, 1991

[54] DECODING DEVICE CAPABLE OF FORWARDLY AND BACKWARDLY REPRODUCING PICTURES WITH A HIGH QUALITY

[75] Inventor: Mutsumi Ohta, Tokyo, Japan

[73] Assignee: NEC Corporation, Japan

[21] Appl. No.: 523,856

[22] Filed: May 15, 1990

[30] Foreign Application Priority Data

May 15, 1989 [JP] Japan ................................. 1-122436

[51] Int. Cl.$^5$ ............................................... H04N 7/12
[52] U.S. Cl. .................................... 358/136; 358/135
[58] Field of Search ................ 358/135, 136, 133, 335

[56] References Cited

U.S. PATENT DOCUMENTS

| | | | |
|---|---|---|---|
| 4,897,855 | 1/1990 | Acampora | 358/136 X |
| 4,942,465 | 7/1990 | Ohta | 358/136 X |
| 4,942,476 | 7/1990 | Koga et al. | 358/136 |

Primary Examiner—Victor R. Kostak
Attorney, Agent, or Firm—Ostrolenk, Faber, Gerb & Soffen

[57] ABSTRACT

In a decoding device for decoding an input signal into a decoded signal, a delay circuit delays the decoded signal into a delayed signal with a delay equal to a frame period of a digital video signal which is encoded into an encoded signal by interframe predictive encoding. A forward filter of a predetermined filtering characteristic filters the delayed signal into a first filtered signal. An adder adds the input signal to the first filtered signal to produce an added signal. A subtracter subtracts the input signal from the delayed signal to produce a subtracted signal. An inverse filter filters the subtracted signal into a second filtered signal. Responsive to a mode signal, a selector selects one of the added and the second filtered signals to produce, as the decoded signal, the added and the second filtered signals when the mode signal indicates that the input signal is produced in a forward direction from a leading part to a trailing part of the encoded signal and when the mode signal indicates that the input signal is produced in a backward direction reversed relative to the forward direction, respectively. Another inverse filter may be inserted between the delaying circuit and the subtracter. In this case, the subtracter and the second filter are replaced in position with each other.

10 Claims, 7 Drawing Sheets

DECODING DEVICE CAPABLE OF FORWARDLY AND BACKWARDLY REPRODUCING PICTURES WITH A HIGH QUALITY

BACKGROUND OF THE INVENTION

This invention relates to a decoding device for decoding a device input signal read out of a recording medium on which an encoded signal is recorded.

The encoded signal is produced by an encoding device which is for interframe predictive encoding a digital video signal. The digital video signal is, for example, a television signal and comprises successive frames or pictures of a common frame period. The interframe predictive encoding is effective to encode the digital video signal into an encoded signal having a low bit rate. The interframe predictive encoding makes use of a correlation factor between adjacent ones of the pictures or frames. In the interframe predictive encoding, a difference is encoded between corresponding picture elements of two successive pictures to provide the encoded signal. The interframe predictive encoding is generally used in transmitting the digital video signal. The interframe predictive encoding is also used in a video signal processing system which is for use of the recording medium, such as a compact disk read-only memory (CD-ROM), in record and/or reproduce the digital video signal.

In this connection, it is preferable that the compact disk read-only memory can be operable like a video tape in performing not only a normal or forward reproduction but also a reverse or backward reproduction. More specifically, the digital video signal has a zeroth or leading frame to an end or trailing frame which are processed into leading through trailing compressed video signals, respectively, when the digital video signal is subjected to the interframe predictive encoding. The digital video signal is successively recorded on the recording medium from the leading compressed video signal to the trailing compressed video signal in a normal or forward order. Merely for convenience of description, the zeroth through the end frames may be understood to correspond to zeroth through end scenes, respectively. On carrying out the reverse reproduction, the digital video signal is reproduced from the end scene in a reversed or backward order in response to a request issued by an operator or user to indicate the reverse reproduction.

Such a video signal processing system is disclosed in a prior U.S. patent application Ser. No. 189,249 which was filed May 2, 1988, by Toshio Koga, Junichi Ohki, Mutsumi Ohta, and Hideto Kunihiro for assignment to the present assignee and c/o NEC Home Electronics, Ltd. The above-named Mutsumi Ohta is the instant applicant. The Ohta et al patent application corresponds to a prior Canadian patent application No. 565,485 which was filed Apr. 29, 1988, and was filed on the basis of Japanese patent application No. 108352/1987 and others. In the prior patent applications, the video signal processing system is called an image processing system. The digital video signal is called a sequence of image signals.

The prior patent application does not make use of a filter for removing quantization noise which is generated and remains in either an encoding loop of an interframe predictive encoding device or a decoding loop of an interframe predictive decoding device. It is known in the art that the quantization noise is generated and remains in either the encoding loop or the decoding loop. Generation of the quantization noise results in a reduction of the quality of pictures reproduced by each of the normal and the reverse reproductions.

Another video signal processing system is disclosed in another prior United States patent application which was filed May 30, 1989, under the title of "Method of coding a digital video signal for reverse reproduction of pictures", by Mutsumi Ohta for assignment to the present assignee. The above-named Mutsumi Ohta is the instant applicant. The Ohta patent application corresponds to another prior Canadian patent application which was filed May 30, 1989, and is based on Japanese patent application No. 133477/1988. The latter prior patent application does neither use a filter for removing quantization noise which is generated in either the encoding loop or the decoding loop.

SUMMARY OF THE INVENTION

It is therefore an object of this invention to provide a decoding device which can obtain normally and reversely reproduced pictures with a high quality.

Other objects of this invention will become clear as the description proceeds.

A decoding device to which this invention is applicable is for use in combination with a recording medium on which an encoded signal is recorded. The encoded signal is produced by an encoding device which is for carrying out interframe predictive encoding of a digital video signal comprising successive frames of a common frame period. The decoding device is for decoding a device input signal into a decoded signal in response to a mode signal which indicates whether the device input signal is produced in a forward direction from a leading part of the encoded signal to a trailing part of the encoded signal or in a backward direction reversed relative to the forward direction. According to an aspect of this invention, the decoding device comprises delaying means for delaying the decoded signal into a delayed signal with a delay which is equal to the frame period; first filtering means having a predetermined frequency response characteristic for filtering the delayed signal to produce a first filtered signal; adding means for adding the device input signal to the first filtered signal to produce an added signal; subtracting means for subtracting the device input signal from the delayed signal to produce a subtracted signal; second filtering means having an inverse frequency response characteristic relative to the predetermined frequency response characteristic for filtering the subtracted signal to produce a second filtered signal; and selecting means responsive to the mode signal for selecting one of the added and the second filtered signals to produce, as the decoded signal, the added and the second filtered signals when the mode signal indicates that the device input signal is produced in the forward direction and when the mode signal indicates that the device input signal is produced in the backward direction, respectively.

According to another aspect of this invention, the decoding device comprises: delaying means for delaying the decoded signal into a delayed signal with a delay which is equal to the frame period; first filtering means having a predetermined frequency response characteristic for filtering the delayed signal to produce a first filtered signal; adding means for adding the device input signal to the first filtered signal to produce an added signal; second filtering means having an inverse frequency response characteristic relative to the predetermined frequency response characteristic for filtering the delayed signal to produce a second filtered signal; third filtering means having the inverse frequency response characteristic for filtering the device input signal to produce a third filtered signal; subtracting means for subtracting the third filtered signal from the second filtered signal to produce a subtracted signal; and selecting mean responsive to the mode signal for selecting one of the added and the subtracted signals to produce, as the decoded signal, the added and the subtracted signals when the mode signal indicates that the device input signal is produced in the forward direction and when the mode signal indicates that the device input signal is produced in the backward direction, respectively.

DESCRIPTION OF THE PREFERRED DRAWINGS

Figure 1:
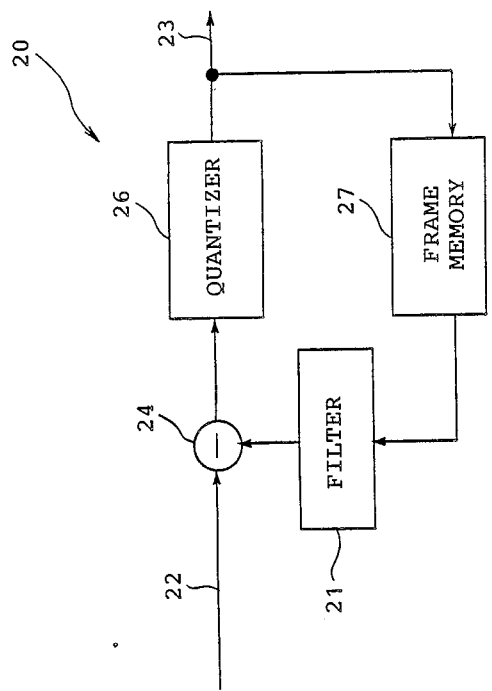
FIG. 1 is a block diagram of an interframe predictive encoder having a filter for use in describing a principle of this invention.

Description will be made at first as regards interframe predictive encoding. A (j, k)-th picture element of an i-th frame or picture of a digital video signal will be represented by $X(i, j, k)$, where i is equal to one of integers 0 through n. Likewise, j is equal to one of integers 1 through p, k is equal to one of integers 1 through q. An interframe prediction error signal (namely, an interframe difference signal), denoted by $E(i, j, k)$, is represented by Formula (1) hereunder:

$$E(i, j, k) = X(i, j, k) - X(i-1, j, k). \qquad (1)$$

According to the interframe predictive encoding, the interframe prediction error signal $E(i, j, k)$ is calculated at first. The interframe prediction error signal $E(i, j, k)$ is subsequently encoded into an encoded signal. In order to carry out a normal or forward reproduction of the picture element $X(i, j, k)$ by decoding the encoded signal in a decoding device, the picture element $X(i, j, k)$ is obtained by Formula (2) hereunder which is given by modification of formula (1)

$$X(i, j, k) = E(i, j, k) + X(i-1, j, k). \qquad (2)$$

It should be noted here that picture elements $X(0, j, k)$ of the zeroth frame or picture are given to the decoding device in order to carry out the normal reproduction by using Formula (2). In general, first and second methods are used in order to supply the decoding device with the picture elements $X(0, j, k)$ of the zeroth picture. In the first method, the picture elements $X(0, j, k)$ of the zeroth picture are encoded by a different encoding method which is different from the interframe encoding. In the Ohta et al patent application described in the preamble of the instant specification, the picture elements $X(0, j, k)$ of the zeroth picture are encoded by using interframe or inframe predictive encoding as the different encoding method. The interframe predictive encoding makes use of a correlation factor between the picture elements within each picture. In the second method, the zeroth picture is a fixed picture which is preliminarily determined and is known on the decoding side.

Description will proceed to a reverse or backward reproduction. In order to carry out the reverse reproduction of the picture elements $X(i, j, k)$, the picture elements $X(i, j, k)$ are successively decoded by the decoding device from the n-th frame to the zeroth frame by Formula (3) hereunder which is given by differently modifying Formula (1):

$$X(i-1, j, k) = -E(i, j, k) + X(i, j, k). \qquad (3)$$

In this case, picture elements $X(n, ], k)$ of the n-th or trailing picture should be obtained by the decoding device. In order to carry out the reverse reproduction, the picture elements $X(n, j, k)$ of the n-th picture are also encoded by a different encoding method which is different from the interframe predictive encoding. In the Ohta et al patent application, the picture elements $X(n, j, k)$ of the n-th picture are encoded by using intraframe predictive encoding as the different encoding method. As the different encoding method, use is also made of one of PCM (pulse code modulation) encoding, orthogonal transformation encoding, and vector quantization encoding.

As described in the preamble of the instant specification, quantization noise is generated and remains in either an encoding loop of the encoding device or a decoding loop of the decoding device. When the interframe prediction error signal is encoded into the encoded prediction error signal by using discrete cosine transform (DCT) encoding, a high frequency component of the quantization noise remains in either the encoding loop or the decoding loop. Generation of the quantization noise results in a reduction of the quality of reproduced pictures. To obtain the reproduced pictures with a high quality, a low-pass filter is included in either the encoding loop or the decoding loop for removing the quantization noise.

Referring to FIG. 1, description will proceed to an interframe predictive encoder 20 having a filter 21 included in an encoding loop. The interframe predictive encoder 20 carries out interframe predictive encoding of a digital video signal 22 comprising successive frames having a common frame period. The interframe predictive encoder 20 produces an encoded signal 23.

The interframe predictive encoder 20 comprises a subtracter 24 which subtracts a prediction signal 25 from the digital video signal 22 and produces a prediction error signal representative of a difference between the digital video signal 22 and the prediction signal 25. That is, the subtracter 24 serves as a prediction error producing circuit which responds to the digital video signal and the prediction signal and produces the prediction error signal.

A quantizer 26 quantizes the prediction error signal into a quantized error signal, which is used as the encoded signal 23. Thus, the quantizer 26 is operable as a prediction error encoding circuit which encodes the prediction error signal into the encoded signal 23. A frame memory 27 temporarily memorizes the encoded signal 23 and produces a delayed signal having a delay which is equal to the frame period. Thus, the frame memory 27 serves as a delaying circuit which delays the encoded signal into a delayed signal with the delay.

The filter 21 has a predetermined frequency response characteristic and filters the delayed signal to produce a filtered signal as the prediction signal. Thus, the encoding loop is formed by the subtracter 24, the quantizer 26, the frame memory 27, and the filter 21.

A principle of this invention will now be described.

In a case where the filter 21 is included in the encoding loop, Formula (1) is modified into Formula (4) hereunder:

$$E(i, j, k) = X(i, j, k) - F \cdot X(i-1, j, k), \quad (4)$$

where F represents an operator which operates upon the digital video signal $X(i-1, j, k)$ and which represents operation of the filter 21. Likewise, Formula (2) is modified into Formula (5) hereunder:

$$X(i, j, k) = E(i, j, k) + F \cdot X(i-1, j, k). \quad (5)$$

According to this invention, the normal reproduction of the picture element $X(i, j, k)$ is carried out by decoding the encoded signal in the decoding device in accordance with Formula (5).

In order to carry out the reverse reproduction of the picture elements $X(i, j, k)$, the picture elements $X(i, j, k)$ are successively decoded by the decoding device in accordance with Formula (6) hereunder which is given by modification of Formula (3):

$$X(-1, j, k) = -F^{-1} \cdot E(i, j, k) + F^{-1} \cdot X(i, j, k), \quad (6)$$

where $F^{-1}$ represents an inverse operator of the operator F. Supposing that $F^{-1}$ is a linear operator, as of a finite impulse response (FIR) filter or an infinite impulse response (IIR) filter, Formula (6) is modified into Formula (7) hereunder:

$$X(i-1, j, k) = F^{-1} \cdot \{E(i, j, k) + X(i, j, k)\}. \quad (7)$$

According to this invention, the reverse reproduction is carried out by the decoding device by using either Formula (6) or Formula (7).

Figure 2:
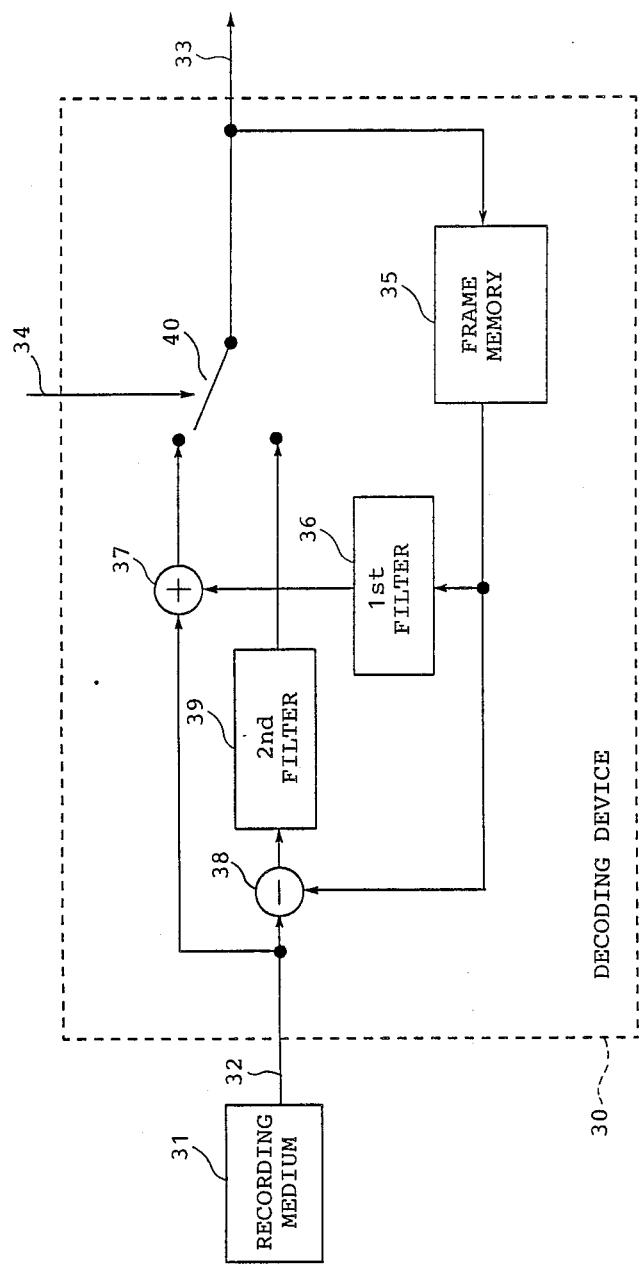
FIG. 2 is a block diagram of a decoding device according to a first embodiment of this invention.

Referring to FIG. 2, a decoding device 30 according to a first embodiment of this invention is for use in combination with a recording medium 31 on which an encoded signal is recorded. The encoded signal is produced by an encoding device having an interframe predictive encoder 20 (FIG. 1) which carries out interframe predictive encoding of a digital video signal 22 (FIG. 1) comprising successive frames of a common frame period.

The decoding device 30 is for decoding a device input signal 32 into a decoded signal 33 in response to a mode signal 34. The mode signal 34 indicates whether the device input signal 32 is produced in a forward direction from a leading part of the encoded signal to a trailing part of the encoded signal or in a backward direction reversed relative to the forward direction. The decoding device 30 comprises a frame memory 35 for temporarily memorizing the decoded signal 33 to produce a delayed signal having a delay which is equal to the frame period. That is, the frame memory 35 serves as a delaying circuit which delays the decoded signal 33 with the delay.

A first filter 36 has the predetermined frequency response characteristic for filtering the delayed signal to produce a first filtered signal. An adder 37 adds the device input signal 32 to the first filtered signal to produce an added signal.

A subtracter 38 subtracts the device input signal 32 from the delayed signal to produce a subtracted signal. A second filter 39 has an inverse frequency response characteristic relative to the predetermined frequency response characteristic and produces a second filtered signal. That is, the second filter 39 is an inverse filter.

Responsive to the mode signal 34, a selector 40 selects one of the added signal and the second filtered signal. The selector 40 is depicted as a mechanical switch merely for convenience of illustrations. The selector 40 thereby produces the added signal as the decoded signal 33 when the mode signal 34 indicates that the device input signal 32 is produced in the forward direction. When the mode signal 34 indicates that the device input signal 32 is produced in the backward direction, the selector 40 produces the second filtered signal as the decoded signal.

Inasmuch as the decoding device 30 has the frame memory 35, the first filter 36, and the adder 37, it is possible for the decoding device 30 to realize the normal or forward reproduction of pictures in accordance with Formula (5). The decoding device 30 can also carry out the reverse or backward reproduction of the pictures in accordance with Formula (7) because the decoding device 30 has the subtracter 38 and the second or inverse filter 39.

Figure 3:
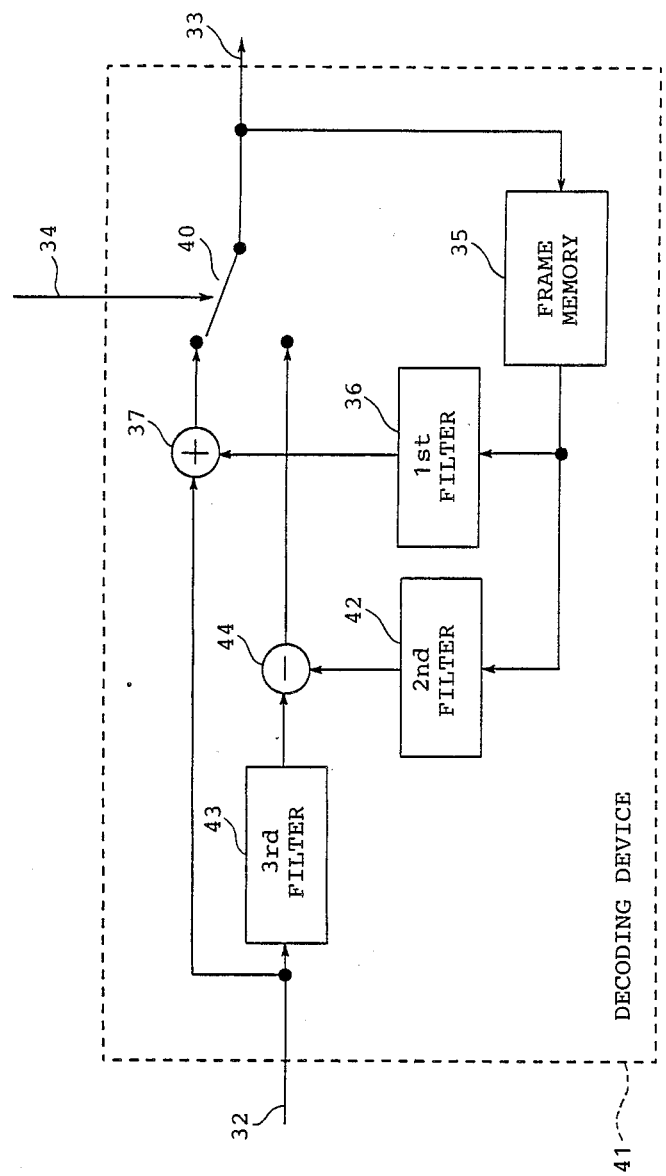
FIG. 3 is a block diagram of a decoding device according to a second embodiment of this invention.

Referring to FIG. 3, a decoding device 41 according to a second embodiment of this invention is similar to the decoding device 30 illustrated in FIG. 2 except that a combination of second and third filters 42 and 43 and a subtracter 44 is used instead of another combination of the subtracter 38 and the second filter 39 of the decoding device 30 illustrated in FIG. 2.

The second filter 42 has an inverse frequency response characteristic relative to the predetermined frequency response characteristic of the first filter 36. The second filter 42 filters the delayed signal and produces a second filtered signal. The third filter 43 has also the inverse frequency response characteristic and filters the device input signal 32 to produce a third filtered signal. That is, each of the second and the third filters 42 and 43 in an inverse filter. The subtracter 44 subtracts the third filtered signal from the second filtered signal to produce a subtracted signal.

The selector 40 selects one of the added signal and the subtracted signal. The selector 40 thereby produces the added signal as the decoded signal 33 when the mode signal 34 indicates that the device input signal 32 is produced in the forward direction. When the mode signal 34 indicates that the device input signal 32 is produced in the backward direction, the selector 40 produces the subtracted signal as the decoded signal.

Inasmuch as the decoding device 41 has the frame memory 35, the first filter 36, and the adder 37 like the decoding device 30, the decoding device 30 can carry out the normal reproduction of pictures in accordance with Formula (5). The decoding device 41 can also carry out the reverse reproduction of the pictures in accordance with Formula (7) because the decoding device 30 has the second and the third filters 42 and 43 and the subtracter 44.

Reviewing FIGS. 2 and 3, it should be noted that each of the inverse filters 39, 42, and 43 can not always be realized so as to have a perfectly inverse characteristic relative to the predetermined frequency response characteristic of the first filter 36. Supposing that each of the inverse filters 39, 42, and 43 has a realized characteristic having a characteristic difference in relation to the perfectly inverse characteristic, the characteristic difference may result in a reduction of the quality of pictures reproduced by the reverse reproduction. In order to obtain reversely reproduced pictures with a high quality, it is necessary to compensate for the characteristic difference. Compensation of the characteristic difference will be described in the following.

Figure 4:
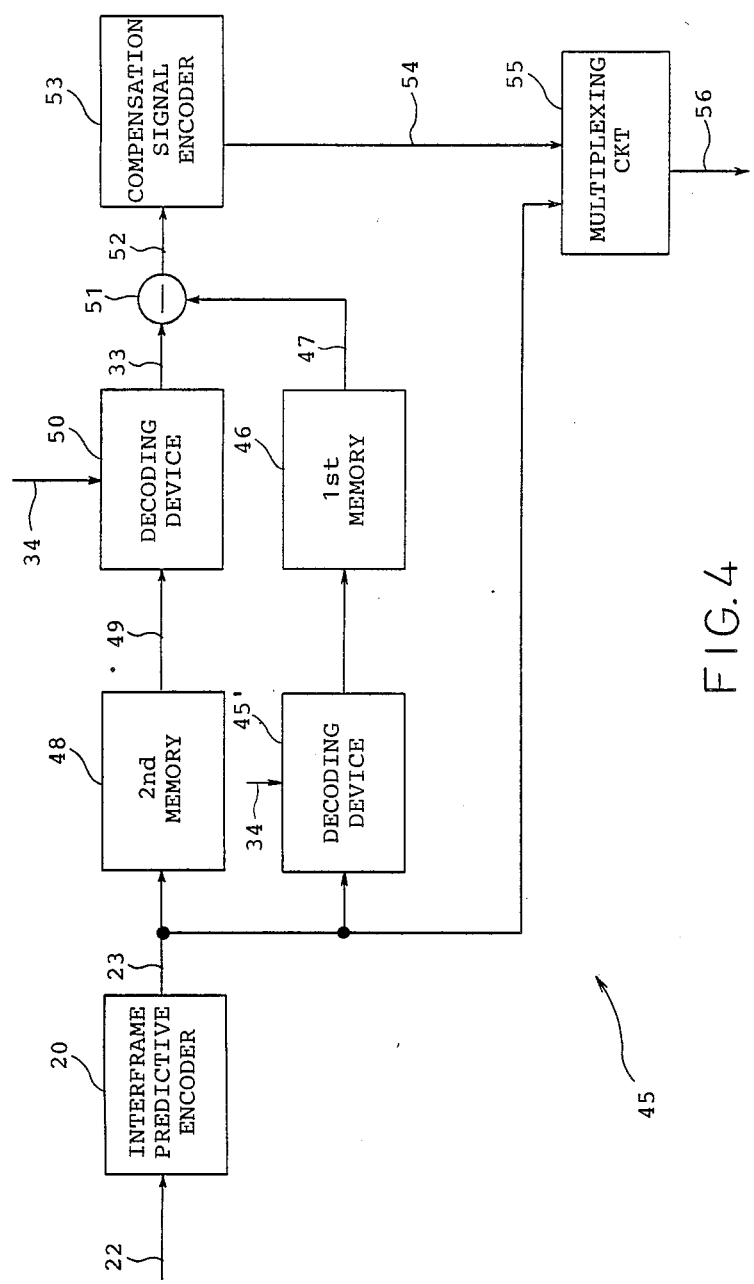
FIG. 4 is a block diagram of an encoding device according to a third embodiment of this invention.

Referring to FIG. 4, an encoding device 45 according to a third embodiment of this invention is suitable in compensating for the characteristic difference in the decoding device 30 illustrated in FIG. 2. The encoding device 45 comprises an interframe predictive encoder 20 similar in structure to that illustrated in FIG. 1. The interframe predictive encoder 20 predictively encodes the digital video signal 22 into a first encoded signal 23.

A decoding device 45' is similar in structure to the decoding device 30 illustrated in FIG. 2 except that the decoding device 45' is supplied with the mode signal 34 which indicates that a device input signal of the decoding device 45' is produced in the forward direction. That is, the selector 40 of the decoding device 45' connects the adder 37 and the frame memory 35. The decoding device 45' decodes the first encoded signal into a first decoded signal. In the decoding device 45', a combination of the subtracter 38 and the second filter 39 may be omitted. In this case, the adder 37 and the frame memory 35 are directly connected to each other.

A first memory 46 memorizes the first decoded signal as a first memorized signal and produces the first memorized signal in a forward direction from a leading part of the first decoded signal to a trailing part of the first decoded signal as a first read-out signal 47. A second memory 48 memorizes the first encoded signal 23 as a second memorized signal and produces the second memorized signal in a backward direction from a leading part of the encoded signal 23 to a trailing part of the encoded signal 23 as a second read-out signal 49. It is readily possible to use the memories 46 and 48 in producing forwardly and backwardly read-out signals as the first and the second read-out signals 47 and 49.

In FIG. 4, a decoding device 50 is similar in structure to the decoding device 30 illustrated in FIG. 2 except that the decoding device 50 is supplied with the mode signal 34 which indicates that a device input signal of the decoding device 50 is produced in the backward direction. That is, the selector 40 of the decoding device 50 connects the second filter 39 and the frame memory 35. The decoding device 50 decodes the second read-out signal 49 into the decoded signal 33. In the decoding device 50, a combination of the first filter 36, the adder 37, and the selector 40 may be omitted. In this case, the second filter 39 and the frame memory 35 are directly connected to each other.

A subtracter 51 subtracts the first read-out signal 47 from the decoded signal 33 to produce a compensation signal 52 representative of a difference between the first read-out signal 47 and the decoded signal 33. That is, the subtracter 51 serves as a compensation signal producing circuit which produces the compensation signal 52. A compensation signal encoder 53 encodes the compensation signal 52 into a second encoded signal 54. A multiplexing circuit 55 multiplexes the first and the second encoded signals 23 and 54 into a multiplexed signal 56. The multiplexed signal 56 is recorded on the recording medium 31 (FIG. 2).

In order to produce a compensation signal for use in compensating for the characteristic difference of the decoding device 41 illustrated in FIG. 3, the decoding device 50 is given the structure of the decoding device 41. Namely, the decoding device 41 is supplied with the mode signal 34 which indicates that a device input signal of the decoding device 41 is produced in the backward direction. In this case, the selector 40 (FIG. 3) of the decoding device 41, which is used as the decoding device 50, connects the subtracter 44 to the frame memory 35. When used as the decoding device 50, the decoding device 41 may not include a combination of the first filter 36, the adder 37, and the selector 40. In this case the subtracter 44 and the frame memory 35 are directly connected to each other in the decoding device 41 used as the decoding device 50.

Figure 5:
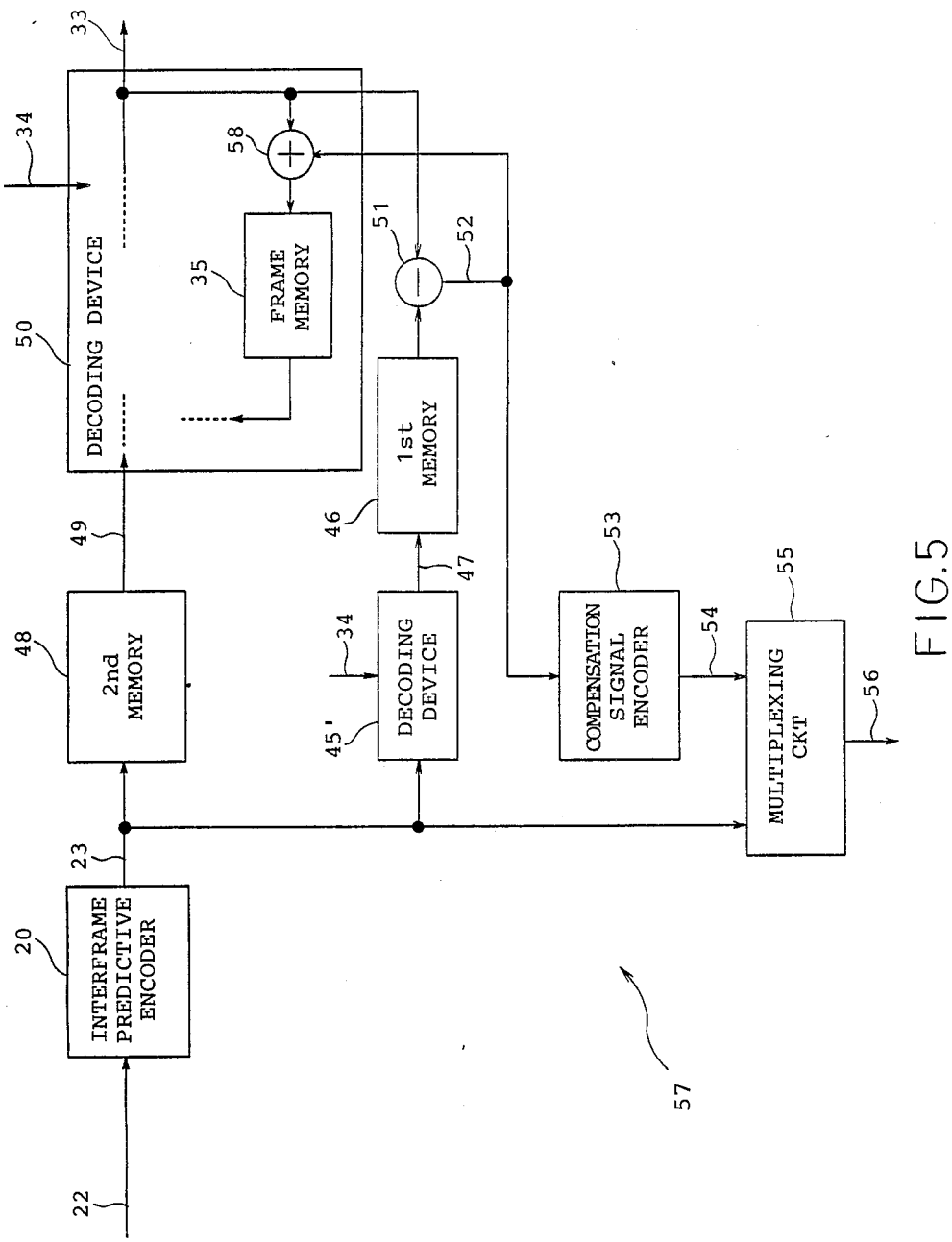
FIG. 5 is a block diagram of an encoding device according to a fourth embodiment of this invention.

Referring to FIG. 5, an encoding device 57 according to a fourth embodiment of this invention is similar to the encoding device 45 illustrated in FIG. 4 except that the decoding device 50 of the encoding device 57 comprises an adder 58 which adds the compensation signal 52 to the decoded signal 33 to produce an added signal. The frame memory 35 of the decoding device 50 delays the added signal into the delayed signal.

Figure 6:
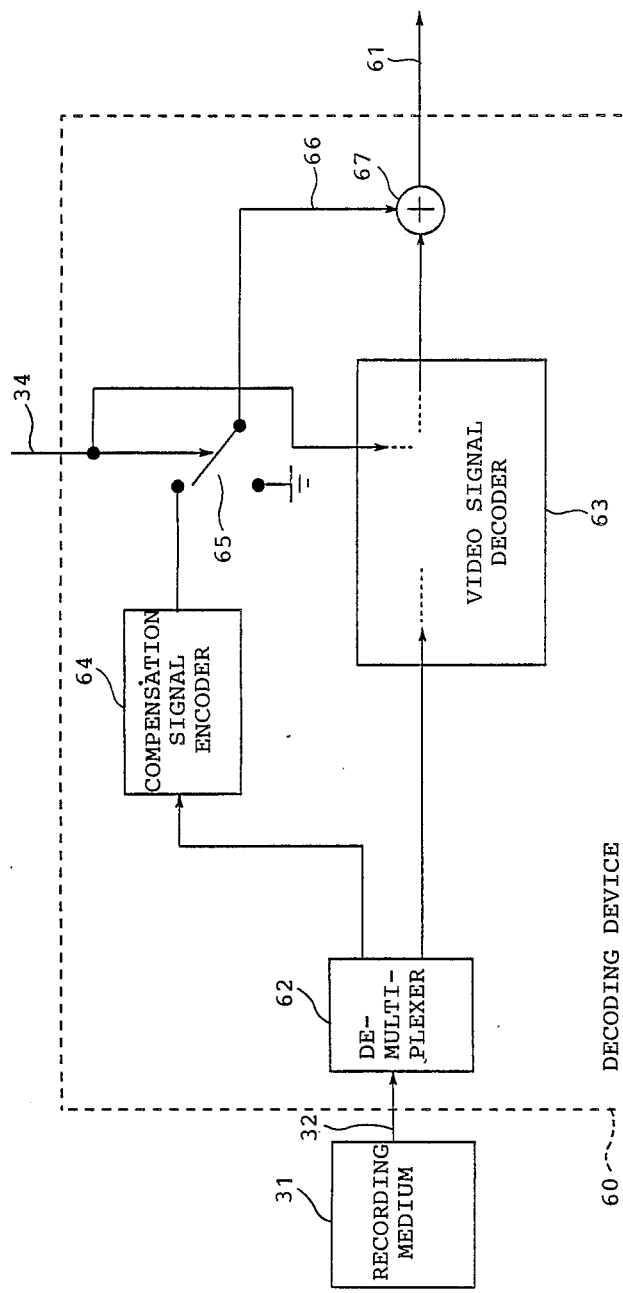
FIG. 6 is a block diagram of a decoding device according to a fifth embodiment of this invention.

Referring to FIG. 6, a decoding device 60 according to a fifth embodiment of this invention is for use in combination with the recording medium 31 on which the multiplexed signal 56 (FIG. 4) is recorded. The multiplexed signal 56 is produced by the encoding device 45 illustrated in FIG. 4. As mentioned above, the encoding device 45 has a decoding device 50 which is similar to the decoding device 30 illustrated in FIG. 2.

The decoding device 60 is for decoding a device input signal 32 into a device output signal 61 in response to a mode signal 34 which indicates whether the device input signal 32 is produced in a forward direction from a leading part of the multiplexed signal to a trailing part of the multiplexed signal or in a backward direction reversed relative to the forward direction.

The decoding device 60 comprises a demultiplexer 62 which demultiplexes the multiplexed signal into reproductions of the first and the second encoded signals 23 and 54 (FIG. 4). A video signal decoder 63 is similar in structure to the decoding device 30 illustrated in FIG. 2. The video signal decoder 63 decodes the reproduction of the first encoded signal into a decoded signal 33 in response to the mode signal 34. A compensation signal decoder 64 decodes the reproduction of the second encoded signal into a reproduction of the compensation signal 52 (FIG. 4).

A selector 65 selects one of the reproduction of the compensation signal and a constant value signal of a zero level in response to the mode signal 34. In this event, the selector 65 produces the reproduction of the compensation signal as a selected signal 66 when the mode signal 34 indicates that the device input signal 32 is produced in the forward direction. When the mode signal 32 indicates that the device input signal 32 is produced in the backward direction, the selector 65 produces the constant value signal as the selected signal 66. An adder 67 adds the selected signal 66 to the decoded signal 33 and produces an added signal as the device output signal 61.

In FIG. 6, it will be assumed that the recording medium 31 memorizes the multiplexed signal produced by the encoding device 45 (FIG. 4) having the decoding device 41 (FIG. 3) which is used as the decoding device 50 (FIG. 4). In this case, the decoding device 41 (FIG. 3) is used as the video signal decoder 63 of the decoding device 60.

Figure 7:
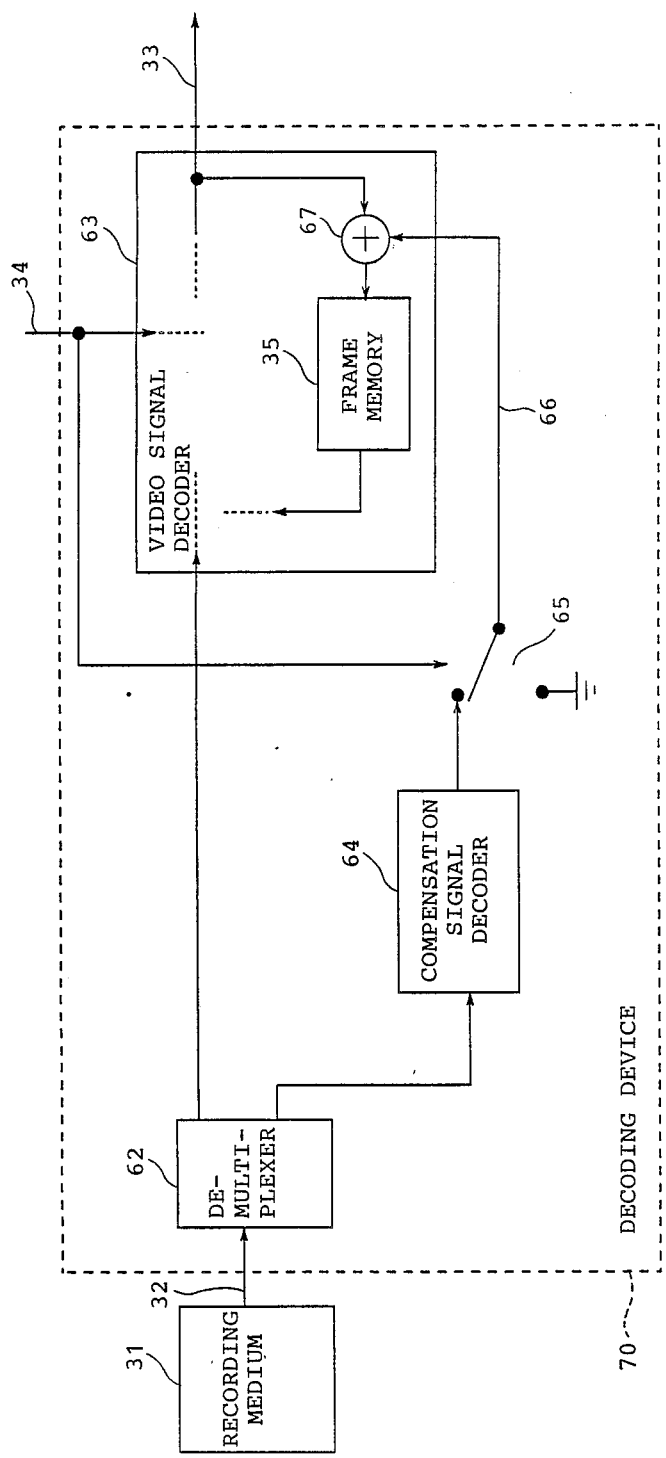
FIG. 7 is a block diagram of a decoding device according to a sixth embodiment of this invention.

Referring to FIG. 7, a decoding device 70 according to a sixth embodiment of this invention is similar to the decoding device 60 illustrated in FIG. 6 except that the recording medium 31 memorizes the multiplexed signal produced by the encoding device 57 (FIG. 5) and that the adder 67 is included in the video signal decoder 63 of the decoding device 70. The adder 67 of the decoding device 70 adds the selected signal 66 to the decoded signal 33 to produce an added signal. The frame memory 35 delays the added signal into the delayed signal with the delay. In FIG. 7, either the decoding device 30 (FIG. 2) or the decoding device 41 (FIG. 3) may be used as the video signal decoder 63 in which the adder 67 is included.

What is claimed is:

1. A decoding device for use in combination with a recording medium on which an encoded signal is recorded, said encoded signal being produced by an encoding device which is for carrying out interframe predictive encoding of a digital video signal comprising successive frames of a common frame period, said decoding device being for decoding a device input signal into a decoded signal in response to a mode signal which indicates whether said device input signal is produced in a forward direction from a leading part of said encoded signal to a trailing part of said encoded signal or in a backward direction reversed relative to said forward direction, said decoding device comprising:
   delaying means for delaying said decoded signal into a delayed signal with a delay which is equal to said frame period;
   first filtering means having a predetermined frequency response characteristic for filtering said delayed signal to produce a first filtered signal;
   adding means for adding said device input signal to said first filtered signal to produce an added signal;
   subtracting means for subtracting said device input signal from said delayed signal to produce a subtracted signal;
   second filtering means having an inverse frequency response characteristic relative to said predetermined frequency response characteristic for filtering said subtracted signal to produce a second filtered signal; and
   selecting means responsive to said mode signal for selecting one of said added and said second filtered signals to produce, as said decoded signal, said added and said second filtered signals when said mode signal indicates that said device input signal is produced in said forward direction and when said mode signal indicates that said device input signal is produced in said backward direction, respectively.

2. A decoding device for use in combination with a recording medium on which an encoded signal is recorded, said encoded signal being produced by an encoding device which is for carrying out interframe predictive encoding of a digital video signal comprising successive frames of a common frame period, said decoding device being for decoding a device input signal into a decoded signal in response to a mode signal which indicates whether said device input signal is produced in a forward direction from a leading part of said encoded signal to a trailing part of said encoded signal or in a backward direction reversed relative to said forward direction, said decoding device comprising:
   delaying means for delaying said decoded signal into a delayed signal with a delay which is equal to said frame period;
   first filtering means having a predetermined frequency response characteristic for filtering said delayed signal to produce a first filtered signal;
   adding means for adding said device input signal to said first filtered signal to produce an added signal;
   second filtering means having an inverse frequency response characteristic relative to said predetermined frequency response characteristic for filtering said delayed signal to produce a second filtered signal;
   third filtering means having said inverse frequency response characteristic for filtering said device input signal to produce a third filtered signal;
   subtracting means for subtracting said third filtered signal from said second filtered signal to produce a subtracted signal; and
   selecting means responsive to said mode signal for selecting one of said added and said subtracted signals to produce, as said decoded signal, said added and said subtracted signals when said mode signal indicates that said device input signal is produced in said forward direction and when said mode signal indicates that said device input signal is produced in said backward direction, respectively.

3. An encoding device comprising:
   an interframe predictive encoder for carrying out interframe predictive encoding of a digital video signal comprising successive frames of a common frame period, said interframe predictive encoder producing a first encoded signal and comprising prediction error producing means responsive to said digital video signal and a prediction signal for producing a prediction error signal representative of a difference between said digital video signal and said prediction signal, prediction error encoding means for encoding said prediction error signal into said first encoded signal, first delaying means for delaying said first encoded signal into a first delayed signal with a delay which is equal to said frame period, and first filtering means having a predetermined frequency response characteristic for filtering said first delayed signal to produce a first filtered signal as said prediction signal;
   first decoding means for decoding said first encoded signal into a first decoded signal;
   first memorizing means for memorizing said first decoded signal as a first memorized signal and for producing said first memorized signal in a forward direction from a leading part of said first decoded signal to a trailing part of said first decoded signal as a first read-out signal;
   second memorizing means for memorizing said first encoded signal as a second memorized signal and for producing said second memorized signal in a backward direction from a trailing part of said first encoded signal to a leading part of said first encoded signal as a second read-out signal;
   second decoding means for decoding said second read-out signal into a second decoded signal;
   compensation signal producing means responsive to said first read-out signal and said second decoded signal for producing a compensation signal representative of another difference between said first read-out signal and said second decoded signal;

compensation signal encoding means for encoding said compensation signal into a second encoded signal; and multiplexing means for multiplexing said first and said second encoded signals into a multiplexed signal;

said first decoding means comprising:

second delaying means for delaying said first decoded signal into a second delayed signal with said delay;

second filtering means having said predetermined frequency response characteristic for filtering said second delayed signal to produce a second filtered signal; and first adding means for adding said first encoded signal to said second filtered signal to produce a first added signal as said first decoded signal;

said second decoding means comprising:

third delaying means for delaying said second decoded signal into a third delayed signal with said delay;

subtracting means for subtracting said second read-out signal from said third delayed signal to produce a subtracted signal; and third filtering means having an inverse frequency response characteristic relative to said predetermined frequency response characteristic for filtering said subtracted signal to produce a third filtered signal as said second decoded signal.

4. An encoding device as claimed in claim 3, wherein said second decoding means further comprises second adding means for adding said compensation signal to said second decoded signal to produce a second added signal, said third delaying means delaying said second added signal into said third delayed signal.

5. An encoding device comprising:

an interframe predictive encoder for carrying out interframe predictive encoding of a digital video signal comprising successive frames of a common frame period, said interframe predictive encoder producing a first encoded signal and comprising prediction error producing means responsive to said digital video signal and a prediction signal for producing a prediction error signal representative of a difference between said digital video signal and said prediction signal, prediction error encoding means for encoding said prediction error signal into said first encoded signal, first delaying means for delaying said first encoded signal into a first delayed signal with a delay which is equal to said frame period, and first filtering means having a predetermined frequency response characteristic for filtering said first delayed signal to produce a first filtered signal as said prediction signal;

first decoding means for decoding said first encoded signal into a first decoded signal;

first memorizing means for memorizing said first decoded signal as a first memorized signal and for producing said first memorized signal in a forward direction from a leading part of said first decoded signal to a trailing part of said first decoded signal as a first read-out signal;

second memorizing means for memorizing said first encoded signal as a second memorized signal and for producing said second memorized signal in a backward direction from a trailing part of said first encoded signal to a leading part of said first encoded signal as a second read-out signal;

second decoding means for decoding said second read-out signal into a second decoded signal;

compensation signal producing means responsive to said first read-out signal and said second decoded signal for producing a compensation signal representative of another difference between said first read-out and said second decoded signals;

compensation signal encoding means for encoding said compensation signal into a second encoded signal; and multiplexing means for multiplexing said first and said second encoded signals into a multiplexed signal;

said first decoding means comprising:

second delaying means for delaying said first decoded signal into a second delayed signal with said delay;

second filtering means having said predetermined frequency response characteristic for filtering said second delayed signal to produce a second filtered signal; and first adding means for adding said first encoded signal to said second filtered signal to produce a first added signal as said first decoded signal;

said second decoding means comprising:

third delaying means for delaying said second decoded signal into a third delayed signal with said delay;

third filtering means having an inverse frequency response characteristic relative to said predetermined frequency response characteristic for filtering said third delayed signal to produce a third filtered signal;

fourth filtering means having said inverse frequency response characteristic for filtering said second read-out signal to produce a fourth filtered signal; and subtracting means for subtracting said fourth filtered signal from said third filtered signal to produce a subtracted signal as said second decoded signal.

6. An encoding device as claimed in claim 5, wherein said second decoding means further comprises second adding means for adding said compensating signal to said second decoded signal to produce a second added signal, said third delaying means delaying said second added signal into said third delayed signal.

7. A decoding device for use in combination with a recording medium on which a multiplexed signal is recorded, said multiplexed signal being produced by an encoding device comprising: (a) an interframe predictive encoder for carrying out interframe predictive encoding of a digital video signal comprising successive frames of a common frame period, said interframe predictive encoder producing a first encoded signal; (b) first decoding means for decoding said first encoded signal into a first decoded signal; (c) first memorizing means for memorizing said first decoded signal as a first memorized signal and for producing said first memorized signal in a forward direction from a leading part of said first decoded signal to a trailing part of said first decoded signal as a first read-out signal; (d) second memorizing means for memorizing said first encoded signal as a second memorized signal and for producing said second memorized signal in a backward direction from a trailing part of said first encoded signal to a leading part of said first encoded signal as a second read-out signal; (e) second decoding means for decoding said second read-out signal into a second decoded signal; (f) compensation signal producing means responsive to said first read-out signal and said second decoded signal for producing a compensation signal representative of a difference between said first read-out signal and said second decoded signal; (g) compensation signal encoding means for encoding said compensation signal into a second encoded signal; and (h) multiplexing means for multiplexing said first and said second encoded signals into a multiplexed signal; said interframe predictive encoder comprising: (a1) prediction error producing means responsive to said digital video signal and a prediction signal for producing a prediction error signal representative of another difference between said digital video signal and said prediction signal; (a2) prediction error encoding means for encoding said prediction error signal into said first encoded signal; (a3) first delaying means for delaying said first encoded signal into a first delayed signal with a delay which is equal to said frame period; and (a4) first filtering means having a predetermined frequency response characteristic for filtering said first delayed signal to produce a first filtered signal as said prediction signal; said first decoding means comprising: (b1) second delaying means for delaying said first decoded signal into a second delayed signal with said delay; (b2) second filtering means having said predetermined frequency response characteristic for filtering said second delayed signal to produce a second filtered signal; and (b3) first adding means for adding said first encoded signal to said second filtered signal to produce a first added signal as said first decoded signal; said second decoding means comprising: (e1) third delaying means for delaying said second decoded signal into a third delayed signal with said delay; (e2) first subtracting means for subtracting said second read-out signal from said third delayed signal to produce a first subtracted signal; and (e3) third filtering means having an inverse frequency response characteristic relative to said predetermined frequency response characteristic for filtering said first subtracted signal to produce a third filtered signal as said second decoded signal; said decoding device being for decoding a device input signal into a device output signal in response to a mode signal which indicates whether said device input signal is produced in a forward direction from a leading part of said multiplexed signal to a trailing part of said multiplexed signal or in a backward direction reversed relative to said forward direction, said decoding device comprising:

demultiplexing mean for demultiplexing said multiplexed signal into a reproduction of said first and said second encoded signals;

third decoding means for decoding the reproduction of said first encoded signal into a third decoded signal in response to said mode signal;

fourth decoding means for decoding the reproduction of said second encoded signal into a reproduction of said compensation signal;

first selecting means responsive to said mode signal for selecting one of the reproduction of said compensation signal and a constant value signal of a zero level to produce, as a selected signal, the reproduction of said compensation signal and said constant value signal when said mode signal indicates that said device input signal is produced in said forward direction and when said mode signal indicates that said device input signal is produced in said backward direction, respectively; and second adding means for adding said selected signal to said third decoded signal to produce a second added signal as said device output signal;

said third decoding means comprising:

fourth delaying means for delaying said third decoded signal into a fourth delayed signal with said delay;

fourth filtering means having said predetermined frequency response characteristic for filtering said fourth delayed signal to produce a fourth filtered signal;

third adding means for adding the reproduction of said first encoded signal to said fourth filtered signal to produce a third added signal;

second subtracting means for subtracting the reproduction of said first encoded signal from said fourth delayed signal to produce a second subtracted signal;

fifth filtering means having said inverse frequency response characteristic for filtering said second subtracted signal to produce a fifth filtered signal; and second selecting means responsive to said mode signal for selecting one of said third added and said fifth filtered signals to produce, as said third decoded signal, said third added and said fifth filtered signals when said mode signal indicates that said device input signal is produced in said forward direction and when said mode signal indicates that said device input signal is produced in said backward direction, respectively.

8. A decoding device for use in combination with a recording medium on which a multiplexed signal is recorded, said multiplexed signal being produced by an encoding device comprising: (a) an interframe predictive encoder for carrying out interframe predictive encoding of a digital video signal comprising successive frames of a common frame period, said interframe predictive encoder producing a first encoded signal; (b) first decoding means for decoding said first encoded signal into a first decoded signal; (c) first memorizing means for memorizing said first decoded signal as a first memorized signal and for producing said first memorized signal in a forward direction from a leading part of said first decoded signal to a trailing part of said first decoded signal as a first read-out signal; (d) second memorizing means for memorizing said first encoded signal as a second memorized signal and for producing said second memorized signal in a backward direction from a trailing part of said first encoded signal to a leading part of said first encoded signal as a second read-out signal; (e) second decoding means for decoding said second read-out signal into a second decoded signal; (f) compensation signal producing means responsive to said first read-out signal and said second decoded signal for producing a compensation signal representative of a difference between said first read-out signal and said second decoded signal; (g) compensation signal encoding means for encoding said compensation signal into a second encoded signal; and (h) multiplexing means for multiplexing said first and said second encoded signals into a multiplexed signal; said interframe predictive encoder comprising: (a1) prediction error producing means responsive to said digital video signal and a prediction signal for producing a prediction error signal representative of another difference between said digital video signal and said prediction signal; (a2) prediction error encoding means for encoding said prediction error signal into said first encoded signal; (a3) first delaying means for delaying said first encoded signal into a first delayed signal with a delay which is equal to said frame period; and (a4) first filtering means having a predetermined frequency response characteristic for filtering said first delayed signal to produce a first filtered signal as said prediction signal; said first decoding means comprising: second delaying means for delaying said first decoded signal into a second delayed signal with said delay; second filtering means having said predetermined frequency response characteristic for filtering said second delayed signal to produce a second filtered signal; and first adding means for adding said first encoded signal to said second filtered signal to produce a first added signal as said first decoded signal; said second decoding means comprising: (e1) third delaying means for delaying said second decoded signal into a third delayed signal with said delay; (e2) third filtering means having an inverse frequency response characteristic relative to said predetermined characteristic for filtering said third delayed signal to produce a third filtered signal; (e3) fourth filtering means having said inverse frequency response characteristic for filtering said second read-out signal to produce a fourth filtered signal; and (e4) first subtracting means for subtracting said fourth filtered signal from said third filtered signal to produce a first subtracted signal as said second decoded signal; said decoding device being for decoding a device input signal into a device output signal in response to a mode signal which indicates whether said device input signal is produced in a forward direction from a leading part of said multiplexed signal to a trailing part of said multiplexed signal or in a backward direction reversed relative to said forward direction, said decoding device comprising:

demultiplexing means for demultiplexing said multiplexed signal into a reproduction of said first and said second encoded signals;

third decoding means for decoding the reproduction of said first encoded signal into a third decoded signal in response to said mode signal;

fourth decoding means for decoding the reproduction of said second encoded signal into a reproduction of said compensation signal;

first selecting means responsive to said mode signal for selecting one of the reproduction of said compensation signal and a constant value signal of a zero level to produce, as a selected signal, the reproduction of said compensation signal and said constant value signal when said mode signal indicates that said device input signal is produced in said forward direction and when said mode signal indicates that said device input signal is produced in said backward direction, respectively; and second adding means for adding said selected signal to said third decoded signal to produce a second added signal as said device output signal;

said third decoding means comprising:

fourth delaying means for delaying said third decoded signal into a fourth delayed signal with said delay;

fifth filtering means having said predetermined frequency response characteristic for filtering said fourth delayed signal to produce a fifth filtered signal;

third adding means for adding the reproduction of said first encoded signal to said fifth filtered signal to produce a third added signal;

sixth filtering means having said inverse frequency response characteristic for filtering said fourth delayed signal to produce a sixth filtered signal;

seventh filtering means having said inverse frequency response characteristic for filtering the reproduction of said first encoded signal into a seventh filtered signal;

second subtracting means for subtracting said seventh filtered signal from said sixth filtered signal to produce a second subtracted signal; and second selecting means responsive to said mode signal for selecting one of said third added and said second subtracted signals to produce, as said third decoded signal, said third added and said second subtracted signals when said mode signal indicates that said device input signal is produced in said forward direction and when said mode signal indicates that said device input signal is produced in said backward direction, respectively.

9. A decoding device for use in combination with a recording medium on which a multiplexed signal is recorded, said multiplexed signal being produced by an encoding device comprising: (a) an interframe predictive encoder for carrying out interframe predictive encoding of a digital video signal comprising successive frames of a common frame period, said interframe predictive encoder producing a first encoded signal; (b) first decoding means for decoding said first encoded signal into a first decoded signal; (c) first memorizing means for memorizing said first decoded signal as a first memorized signal and for producing said first memorized signal in a forward direction from a leading part of said first decoded signal to a trailing part of said first decoded signal as a first read-out signal; (d) second memorizing means for memorizing said first encoded signal as a second memorized signal and for producing said second memorized signal in a backward direction from a trailing part of said first encoded signal to a leading part of said first encoded signal as a second read-out signal; (e) second decoding means for decoding said second read-out signal into a second decoded signal; (f) compensation signal producing means responsive to said first read-out signal and said second decoded signal for producing a compensation signal representative of a difference between said first read-out signal and said second decoded signal; (g) compensation signal encoding means for encoding said compensation signal into a second encoded signal; and (h) multiplexing means for multiplexing said first and said second encoded signals into a multiplexed signal; said interframe predictive encoder comprising: (a1) prediction error producing means responsive to said digital video signal and a prediction signal for producing a prediction error signal representative of another difference between said digital video signal and said prediction signal; (a2) prediction error encoding means for encoding said prediction error signal into said first encoded signal; (a3) first delaying means for delaying said first encoded signal into a first delayed signal with a delay which is equal to said frame period; and (a4) first filtering means having a predetermined frequency response characteristic for filtering said first delayed signal to produce a first filtered signal as said prediction signal; said first decoding means comprising: (b1) second delaying means for delaying said first decoded signal into a second delayed signal with said delay; (b2) second filtering means having said predetermined frequency response characteristic for filtering said second delayed signal to produce a second filtered signal; and (b3) first adding means for adding said first encoded signal to said second filtered signal to produce a first added signal as said first decoded signal; said second decoding means comprising: (e1) second adding means for adding said compensation signal to said second decoded signal to produce a second added signal; (e2) third delaying mean for delaying said second added signal into a third delayed signal with said delay; (e3) first subtracting means for subtracting said second read-out signal from said third delayed signal to produce a first subtracted signal; and (e4) third filtering means having an inverse frequency response characteristic relative to said predetermined frequency response characteristic for filtering said first subtracted signal to produce a third filtered signal as said second decoded signal; said decoding device being for decoding a device input signal into a device output signal in response to a mode signal which indicates whether said device input signal is produced in a forward direction from a leading part of said multiplexed signal to a trailing part of said multiplexed signal or in a backward direction reversed relative to said forward direction, said decoding device comprising:

- demultiplexing means for demultiplexing said multiplexed signal into a reproduction of said first and said second encoded signals;
- third decoding means for decoding the reproduction of said first encoded signal into a third decoded signal in response to said mode signal, said third decoded signal being for use as said device output signal;
- fourth decoding means for decoding the reproduction of said second encoded signal into a reproduction of said compensation signal; and
- first selecting means responsive to said mode signal for selecting one of the reproduction of said compensation signal and a constant value signal of a zero level to produce, as a selected signal, the reproduction of said compensation signal and said constant value signal when said mode signal indicates that said device input signal is produced in said forward direction and when said mode signal indicates that said device input signal is produced in said backward direction, respectively;
- said third decoding means comprising:
- third adding means for adding said selected signal to said third decoded signal to produce a third added signal;
- fourth delaying means for delaying said third added signal into a fourth delayed signal with said delay;
- fourth filtering means having said predetermined frequency response characteristic for filtering said fourth delayed signal to produce a fourth filtered signal;
- fourth adding means for adding the reproduction of said first encoded signal to said fourth filtered signal to produce a fourth added signal;
- second subtracting means for subtracting the reproduction of said first encoded signal from said fourth delayed signal to produce a second subtracted signal;
- fifth filtering means having said inverse frequency response characteristic for filtering said second subtracted signal to produce a fifth filtered signal; and
- second selecting means responsive to said mode signal for selecting one of said fourth added and said fifth filtered signals to produce, as said third decoded signal, said fourth added and said fifth filtered signals when said mode signal indicates that said device input signal is produced in said forward direction and when said mode signal indicates that said device input signal is produced in said backward direction, respectively.

10. A decoding device for use in combination with a recording medium on which a multiplexed signal is recorded, said multiplexed signal being produced by an encoding device comprising: (a) an interframe predictive encoder for carrying out interframe predictive encoding of a digital video signal comprising successive frames of a common frame period, said interframe predictive encoder producing a first encoded signal; (b) first decoding means for decoding said first encoded signal into a first decoded signal; (c) first memorizing means for memorizing said first decoded signal as a first memorized signal and for producing said first memorized signal in a forward direction from a leading part of said first decoded signal to a trailing part of said first decoded signal as a first read-out signal; (d) second memorizing means for memorizing said first encoded signal as a second memorized signal and for producing said second memorized signal in a backward direction from a trailing part of said first encoded signal to a leading part of said first encoded signal as a second read-out signal; (e) second decoding means for decoding said second read-out signal into a second decoded signal; (f) compensation signal producing means responsive to said first read-out signal and said second decoded signal for producing a compensation signal representative of a difference between said first read-out signal and said second decoded signal; (g) compensation signal encoding means for encoding said compensation signal into a second encoded signal; and (h) multiplexing means for multiplexing said first and said second encoded signals into a multiplexed signal; said interframe predictive encoder comprising: (a1) prediction error producing means responsive to said digital video signal and a prediction signal for producing a prediction error signal representative of another difference between said digital video signal and said prediction signal; (a2) prediction error encoding means for encoding said prediction error signal into said first encoded signal; (a3) first delaying means for delaying said first encoded signal into a first delayed signal with a delay which is equal to said frame period; and (a4) first filtering means having a predetermined frequency response characteristic for filtering said first delayed signal to produce a first filtered signal as said prediction signal; said first decoding means comprising: (b1) second delaying means for delaying said first decoded signal into a second delayed signal with said delay; (b2) second filtering means having said predetermined frequency response characteristic for filtering said second delayed signal to produce a second filtered signal; and (b3) first adding means for adding said first encoded signal to said second filtered signal to produce a first added signal as said first decoded signal; said second decoding means comprising: (e1) second adding means for adding said compensation signal to said second decoded signal to produce a second added signal; (e2) third delaying means for delaying said second added signal into a third delayed signal with said delay; (e3) third filtering means having an inverse frequency response characteristic relative to said predetermined frequency response characteristic for filtering said third delayed signal into a third filtered signal; (e4) fourth filtering means having said inverse frequency response characteristic for filtering said second read-out signal to produce a fourth filtered signal; and (e5) first subtracting means for subtracting said fourth filtered signal from said third delayed signal to produce a first subtracted signal as said second decoded signal; said decoding device being for decoding a device input signal into a device output signal in response to a mode signal which indicates whether said device input signal is produced in a forward direction from a leading part of said multiplexed signal to a trailing part of said multiplexed signal or in a backward direction reversed relative to said forward direction, said decoding device comprising:

- demultiplexing means for demultiplexing said multiplexed signal into a reproduction of said first and said second encoded signals;
- third decoding means for decoding the reproduction of said first encoded signal into a third decoded signal in response to said mode signal, said third decoded signal being for use as said device output signal;
- fourth decoding means for decoding the reproduction of said second encoded signal into a reproduction of said compensation signal; and
- first selecting means responsive to said mode signal for selecting one of the reproduction of said compensation signal and a constant value signal of a zero level to produce, as a selected signal, the reproduction of said compensation signal and said constant value signal when said mode signal indicates that said device input signal is produced in said forward direction and when said mode signal indicates that said device input signal is produced in said backward direction, respectively;

said third decoding means comprising:

- third adding means for adding said selected signal to said third decoded signal to produce a third added signal;
- fourth delaying means for delaying said third added signal into a fourth delayed signal with said delay;
- fifth filtering means having said predetermined frequency response characteristic for filtering said fourth delayed signal to produce a fifth filtered signal;
- fourth adding means for adding the reproduction of said first encoded signal to said fifth filtered signal to produce a fourth added signal;
- sixth filtering means having said inverse frequency response characteristic for filtering said fourth delayed signal into a sixth filtered signal;
- seventh filtering means having said inverse frequency response characteristic for filtering the reproduction of said first encoded signal to produce a seventh filtered signal;
- second subtracting means for subtracting said seventh filtered signal from said sixth filtered signal to produce a second subtracted signal; and
- second selecting means responsive to said mode signal for selecting one of said fourth added and said second subtracted signals to produce, as said third decoded signal, said fourth added and said second subtracted signals when said mode signal indicates that said device input signal is produced in said forward direction and when said mode signal indicates that said device input signal is produced in said backward direction, respectively.

* * * * *